Feb. 20, 1934.    J. W. BRUNETTE    1,948,062
FLUID REGULATING AND CUT-OFF VALVE
Filed July 11, 1933        2 Sheets-Sheet 1
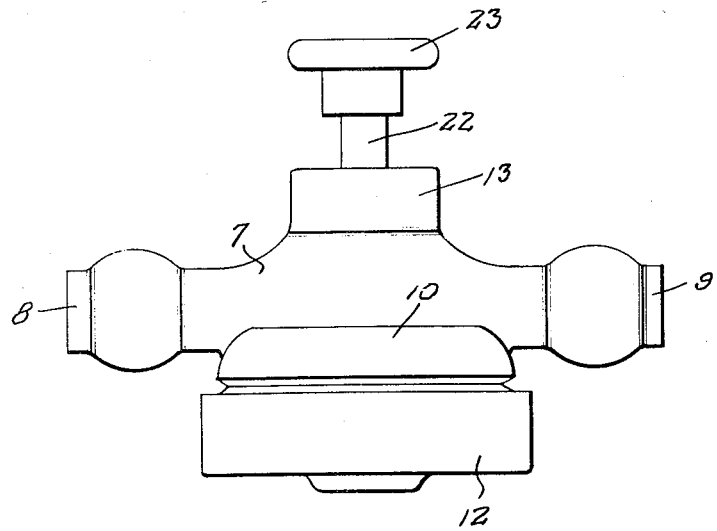
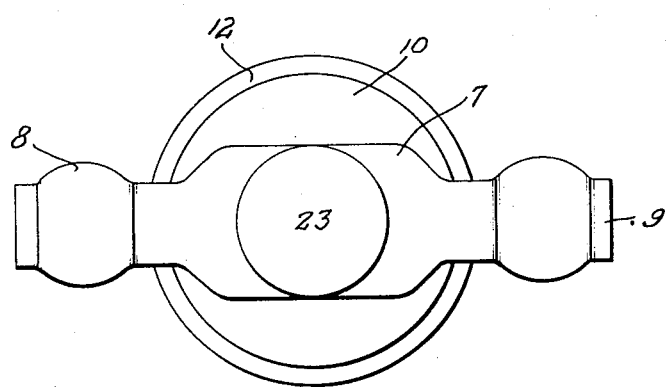
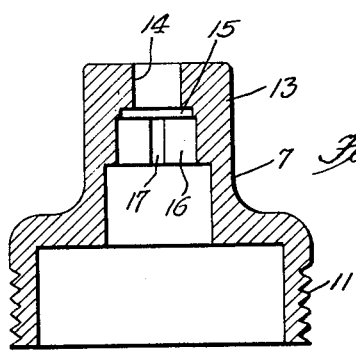
Inventor
J. W. Brunette,
By Clarence A. O'Brien
Attorney Feb. 20, 1934.     J. W. BRUNETTE     1,948,062
FLUID REGULATING AND CUT-OFF VALVE
Filed July 11, 1933     2 Sheets-Sheet 2
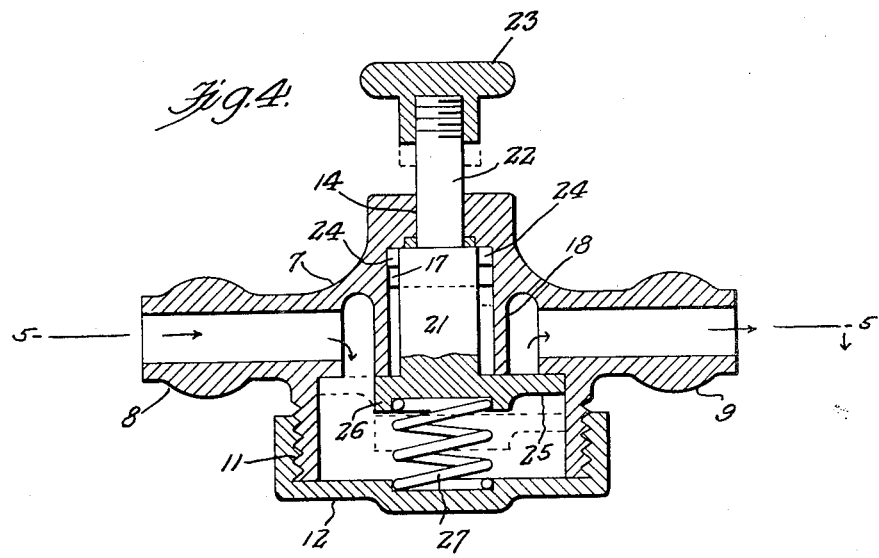
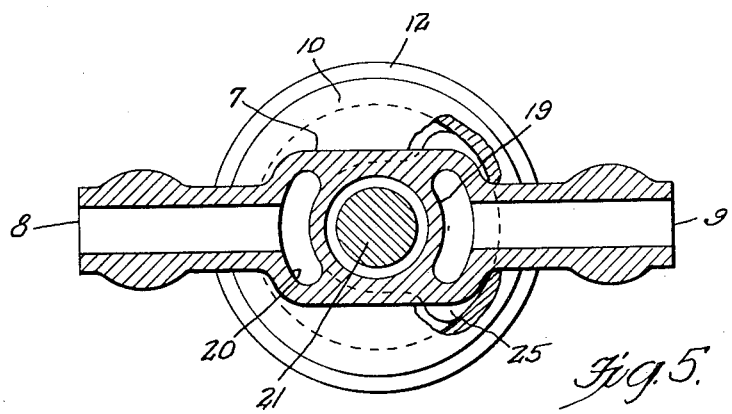
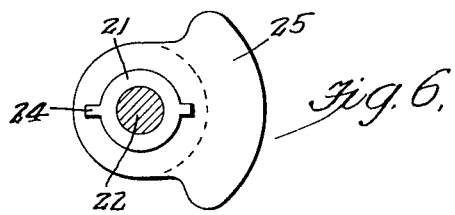
Inventor
J. W. Brunette,
By Clarence A. O'Brien
Attorney Patented Feb. 20, 1934

1,948,062

UNITED STATES PATENT OFFICE 1,948,062

FLUID REGULATING AND CUT-OFF VALVE

Joseph W. Brunette, Detroit, Mich.

Application July 11, 1933. Serial No. 679,972

3 Claims. (Cl. 251—137)

This invention relates to an improved fluid flow control and cut-off valve which is especially designed for installation in a rubber hose line such as is used in connection with syringes and similar irrigating apparatuses.

As a general rule, the hose line of a syringe is equipped with a spring-metal clip slidably mounted on the hose and adapted to squeeze the hose in order to cut off the flow of water. This type of hose control device is inconvenient, unhandy, and unreliable and not devised to allow the velocity or rate of flow of the water to be regulated.

I have therefore discovered the need for a simple and economical control and cut-off valve particularly adapted for incorporation in the hose line, said valve embodying an automatic spring-closed valve unit made in the form of a manually depressible plunger conveniently arranged to permit it to be satisfactorily manipulated to regulate the flow of water according to the discretion of the user.

In carrying the principles of the present inventive conception into actual practice, I have evolved and produced a simple and economical valve construction which is readily machinable and of a double-acting reversible type in that it permits the flow of water to be controlled to flow in either direction.

Other features and advantages of the invention will become more readily apparent from the following description and drawings.

In the drawings:

Figure 1 is a side elevational view of a valve constructed in accordance with the invention illustrating the construction and arrangement thereof.

Figure 2 is a top plan view of Figure 1.

Figure 3 is a sectional view of the body portion of the valve showing features of the internal formation.

Figure 4 is a view in section and elevation which may be described as a longitudinal sectional view.

Figure 5 is a horizontal sectional view taken approximately on the plane of the line 5—5 of Figure 4.

Figure 6 is a cross sectional view through the lower portion of the slidable and turnable valve unit per se.

The entire structure may be of any appropriate material such as hard rubber or the like, and is composed of primarily two parts which may be described as the valve casing or body and the valve unit, respectively. The valve body is of general rectangular form as indicated at 7 and provided at opposite ends with diametrically opposed longitudinally aligned nipples 8 and 9, having terminal enlargements adapted to accommodate the hose ends (not shown). The base portion 10 is of general circular form and provided with an externally screw-threaded depending annular rim 11 to accommodate a removable screw cap 12.

The crown portion 13 is of appropriate form and dimensions and embodies an aperture 14 constituting a guide and below the aperture it is counterbored as indicated at 15 to provide a seat for a packing ring, and below this it is further counterbored as indicated at 16 and in the wall is provided with diametrically opposed grooves 17 forming keyways. On the interior of the body there is a depending cylindrical shell-like formation 18 which may be described as a "stop" and on diametrically opposite sides of this are arcuate ports 19 and 20 registering with the two nipples 8 and 9.

The valve unit comprises a cylindrical stem 21 whose upper end portion 22 is reduced and extended up through and beyond the guide 14 and threaded to accommodate a knob or button 23. The portion 21 is provided with diametrically opposite lugs 24 adapted to serve as keys and to register with the keyways 17. The valve head or closing element 25 is of general segmental form and fashioned to provide an effective closure for either one of the two ports 19 or 20 as the case may be.

In its underside, the valve head is fashioned with a socket 26 to accommodate a return spring 27 held removably in place by the detachable cap 12 as shown in Figure 4. Normally, when the valve is closed, the keys or lugs 24 are forced up into the keyway 17 under the action of the spring as shown in Figure 4. At this time, the valve head or plate 25 closes the port 18. Obviously however, by depressing the knob 23 against the tension of the spring, the valve head may be unseated sufficiently to permit the water to flow through the valve according to the demands of the user. The water can be cut off at any time, by simply releasing the pressure on the knob.

Whenever it is desired to change the direction of flow of the water from that shown in Figure 4 in full lines, all that is necessary is to depress the plunger-like valve sufficiently to compress the spring 27. When the valve is forced down sufficiently, the lugs or keys 24 ride out of the keyways 17. Then by giving the valve a slight turn, the lugs serve to hold the valve open or by turning the valve through one-half revolution, the position of the valve head may be changed to the dotted line position shown in Figure 4. Thus the flow of the water can be reversed in a valve of this type.

Particularly do I wish to emphasize the arrangement wherein the plunger-like spring-closed valve unit may be easily forced in with a slight pressure of the finger to open the valve and then slightly turned and locked in an open position. Secondly, I wish to emphasize that the valve unit is sufficiently turnable as to permit its position to be changed to cover either one of the two ports 19 or 20, according to the discretion of the user. In this sense, the valve is of a duplex or reversible type.

In conclusion, I wish to emphasize the practicability and simplicity of the device in that it is easily machinable, susceptible of expeditious assembly, easy to repair, and convenient to handle.

A careful consideration of the foregoing description in conjunction with the illustrative drawings will enable the reader to obtain a clear understanding of the purpose, features and advantages, the explicit construction, and the invention as hereinafter claimed.

It is to be understood that minor changes in shape, size, relative proportions and materials may be resorted to in actual practice without departing from the spirit of the invention or the scope of the invention as now claimed.

I claim:

1. A hose line valve of the class described comprising a hollow body embodying longitudinally aligned diametrically opposite nipples to accommodate the hose ends, said body being formed at the inner ends of said nipples with ports in communication with the nipples, selectively usable seats surrounding said ports and a spring-pressed valve unit embodying a spring-returned manually depressible plunger having a valve head selectively engageable with either of said seats.

2. A valve structure of the class described comprising a body including a hollow centralized body portion having a pair of longitudinally aligned hose attaching nipples, said body including a circular base portion having a depending screw-threaded rim, a detachable screw-threaded cap threadedly connected with said rim, the interior of said body having a pair of diametrically opposite ports in communicating relationship with said nipples selectively usable seats surrounding said ports, a slidable and rotary valve unit comprising a stem formed at its inner end with a valve head selectively engageable with said seats, said valve body being fashioned with a guide to accommodate a portion of the stem, the outer end portion of said stem being provided with a depressing knob, the valve head being fashioned with a spring-retention seat, said cap being formed with a spring holding seat, a spring arranged in said seats for normally retaining the valve head closed.

3. A valve structure of the class described comprising a body including a hollow centralized body portion having a pair of longitudinally aligned hose attaching nipples, said body including a circular base portion having a depending screw-threaded rim, a detachable screw-threaded cap threadedly connected with said rim, the interior of said body having a pair of diametrically opposite ports in communicating relationship with said nipples, selectively usable seats surrounding said ports, a slidable and rotary valve unit comprising a stem formed at its inner end with a valve hand selectively engageable with said seats, said valve body being fashioned with a guide to accommodate a portion of the stem, the outer end portion of said stem being provided with a depressing knob, the valve head being fashioned with a spring-retention seat, said cap being formed with a spring holding seat, a spring arranged in said seats for normally retaining the valve head closed, said valve body being formed on its interior with a pair of diametrically disposed grooves constituting keyways, said stem having diametrically located lugs forming keys and slidable in said keyways, the keys and keyways serving to normally retain the valve in a predetermined position relative to the valve seat and allowing said valve to be rotated when the keys are moved out of engagement with said keyways.

JOSEPH W. BRUNETTE.